United States Patent
Kirk et al.

(10) Patent No.: US 9,963,030 B2
(45) Date of Patent: May 8, 2018

(54) METHODS, SYSTEMS AND APPARATUS FOR AIRCRAFT AUXILIARY FUEL TANKS

(71) Applicant: Long Range AG, Hergiswil (CH)

(72) Inventors: Philip Kirk, Encinitas, CA (US); Om Prakash, Everett, WA (US); Peter Swift, Woodinville, WA (US)

(73) Assignee: Long Range AG, Hergiswil (CH)

( * ) Notice: Subject to any disclaimer, the term of this patent is extended or adjusted under 35 U.S.C. 154(b) by 0 days. days.

(21) Appl. No.: 14/500,988

(22) Filed: Sep. 29, 2014

(65) Prior Publication Data

US 2015/0107682 A1    Apr. 23, 2015

Related U.S. Application Data

(60) Provisional application No. 61/883,938, filed on Sep. 27, 2013.

(51) Int. Cl.
*B60K 15/06* (2006.01)
*B64C 1/20* (2006.01)
(Continued)

(52) U.S. Cl.
CPC ............ *B60K 15/06* (2013.01); *B60K 15/035* (2013.01); *B60K 15/067* (2013.01); *B64C 1/20* (2013.01);
(Continued)

(58) Field of Classification Search
CPC ........... B64D 2700/62394; B64D 2700/62385; B64D 37/00; B64D 37/005; B64D 37/02;
(Continued)

(56) References Cited

U.S. PATENT DOCUMENTS 2,364,605 A * 12/1944 Curtis .................... F02M 37/20
134/14
2,395,113 A * 2/1946 Goddard ................... F02K 9/44
60/223
(Continued)

FOREIGN PATENT DOCUMENTS

EP       1378445 A2    1/2004
FR       1258293 A     4/1961
(Continued)

OTHER PUBLICATIONS

Federal Aviation Admistration (FAA), Federal Aviation Regulation (FAR), Sec. 27.965 (14 CFR Part 27) [Amdt. 27-12, 42 FR 15045, Mar. 17, 1977]; accessed from RisingUp Aviation, http://www.risingup.com/fars/info/part27-965-FAR.shtml, accesssed Feb. 13, 2017.*

*Primary Examiner* — Tien Q Dinh
*Assistant Examiner* — Alexander V. Giczy
(74) *Attorney, Agent, or Firm* — DWC Law Firm, P.S.; David Chen

(57) ABSTRACT

An aircraft auxiliary fuel tank system comprising a master tank and a plurality of slave tanks fluidly connectable to the master tank in series. The slave tanks may each include a valve assembly comprising a biased plate that is movable for throttling fluid during a deceleration event when the slave tanks are connected to the master tank or other slave tanks. A rail assembly is provided to assist in the easy installation and removal of the slave and master fuel tanks.

9 Claims, 12 Drawing Sheets

(51) Int. Cl.
 *B64D 37/00* (2006.01)
 *B64D 37/04* (2006.01)
 *B64D 37/20* (2006.01)
 *B60K 15/035* (2006.01)
 *B60K 15/067* (2006.01)
 *B60K 15/03* (2006.01)

(52) U.S. Cl.
 CPC .............. *B64D 37/00* (2013.01); *B64D 37/04* (2013.01); *B64D 37/20* (2013.01); *B60K 2015/03144* (2013.01); *B60K 2015/03164* (2013.01); *B60K 2015/03217* (2013.01); *B60K 2015/03447* (2013.01); *Y10T 137/6906* (2015.04); *Y10T 137/86187* (2015.04); *Y10T 137/86196* (2015.04)

(58) Field of Classification Search
 CPC ........ B64D 37/04; B64D 37/06; B64D 37/20; Y10T 137/86187; Y10T 137/86196; B60K 15/06; B60K 15/035; B60K 15/067
 See application file for complete search history.

(56) References Cited

U.S. PATENT DOCUMENTS

| | | | | |
|---|---|---|---|---|
| 2,557,438 A * | 6/1951 | Johnson | ................. | B64D 37/20 137/256 |
| 2,951,664 A | 9/1960 | Smith | | |
| 3,012,572 A * | 12/1961 | Bargetzi, Jr. | ........ | F16K 17/0413 137/473 |
| 3,050,999 A * | 8/1962 | Edwards | .............. | B64D 37/005 73/304 C |
| 3,212,077 A * | 10/1965 | Edwards | .............. | B64D 37/005 327/231 |
| 4,307,744 A | 12/1981 | Marrison | | |
| 4,989,809 A | 2/1991 | Arnold | | |
| 5,704,387 A * | 1/1998 | Sims | ................ | B60K 15/03006 137/263 |
| 6,736,354 B2 * | 5/2004 | Goto | ..................... | B64D 37/08 137/572 |
| 2003/0057326 A1* | 3/2003 | Medina | .................... | B64D 9/00 244/137.1 |
| 2005/0072880 A1 | 4/2005 | Nolan | | |
| 2005/0178880 A1 | 8/2005 | Howe | | |
| 2006/0220890 A1* | 10/2006 | Davis | .................... | B64D 37/00 340/612 |
| 2008/0149772 A1* | 6/2008 | Sandiford | ............ | B64D 37/005 244/135 R |
| 2009/0050743 A1* | 2/2009 | Barbosa | .................. | B64C 17/10 244/135 A |
| 2011/0147523 A1* | 6/2011 | West | .................... | B64D 37/005 244/123.1 |
| 2013/0313818 A1* | 11/2013 | Remfry | ................... | F16L 37/08 285/33 |
| 2015/0075267 A1* | 3/2015 | Sweppy | ............... | G01M 3/3272 73/114.43 |

FOREIGN PATENT DOCUMENTS

WO 2007071909 A1 6/2007
WO 2009137942 A1 11/2009

* cited by examiner

METHODS, SYSTEMS AND APPARATUS FOR AIRCRAFT AUXILIARY FUEL TANKS

BACKGROUND OF THE INVENTION

1. Field of the Invention

The present disclosure relates to aircraft auxiliary fuel tanks.

2. Related Art

Powered aircraft require fuel on board to operate the engine(s). In many commercial aircraft, fuel capacity can be a limitation which can be addressed by the use of auxiliary fuel tanks. At the same time, auxiliary fuel tanks can add weight to aircraft and occupy space, so ideally they can be installed or removed depending on requirements for a flight. However, auxiliary fuel tanks can be difficult to install or remove, due to their size and weight.

BRIEF SUMMARY

Some embodiments of the present disclosure comprise an auxiliary fuel tank system for an aircraft including a plurality of auxiliary fuel tanks and a plurality of rails connected to a plurality of rail supports. The plurality of auxiliary fuel tanks can be separately and easily removably coupled to the rails and can be installed or removed modularly to adjust fuel capacity.

In some embodiments, the auxiliary fuel tanks include a master fuel tank and at least one slave fuel tank fluidly connected to the master fuel tank. Also, a second slave fuel tank can be fluidly connected to the first slave fuel tank, and the master fuel tank can be connected to a fuel delivery system. The master fuel tank can contain instrumentation for monitoring fuel level for the master fuel tank and the slave tanks. In some embodiments, a second master fuel tank is provided, and at least one slave fuel tank is connected to the second master fuel tank. Also, the first and second master fuel tanks can be disposed at ends portions of a center fuel tank of the aircraft.

In some embodiments, the rails used for retaining the auxiliary fuel tanks are installable in sections against the rail supports and rails can be connected to the rail supports by connection members inserted within slots in the rail and rail supports. In some embodiments, the connection members can "hook" the rail and rail supports together such that they must be pivoted vertically to connect the connection members between the rail and rail supports, or to remove the connection members.

In some embodiments, the auxiliary fuel tanks are coupled to the rails by sliding the auxiliary fuel tanks over the rails. Rail supports can be mounted below a floor of the aircraft, and the rails can be mounted above the floor of the aircraft (such as in a cargo cabin). Receiving tracks can be coupled to the auxiliary fuel tanks, on bottom portions thereof. The receiving tracks can each have a pair of walls that extend downward and inward to slidably receive the rails when connecting the auxiliary fuel tanks to the rails. Also, in some embodiments, when the rails are received within the receiving tracks, at least a portion of the walls of the receiving tracks are disposed between a first flange of the rail and a second flange of the rail.

Various embodiments of the present disclosure also include methods for providing auxiliary fuel, including, for example, storing slave tanks at a plurality of different locations and receiving a reservation for one more slave tanks from an aircraft operator for a particular location designated by the operator. The method can include installing the slave tank for the aircraft operator at, or near, the location for which the reservation was made.

In some embodiments, fittings are provided between slidably removable auxiliary fuel tanks, with male portions of the fittings being insertable into connection ports the auxiliary fuel tanks to connect the fuel tanks. Elastomeric collars can be positioned over the fittings, between the connection ports on adjacent fuel tanks, with opposite end portions of the elastomeric collars disposed within annular grooves on the adjacent fuel tanks. The fittings can be retained in connected position between the adjacent fuel tanks using one or more stop blocks connected to rails to hold the adjacent fuel tanks at fixed positions relative to one another.

In some embodiments of the present disclosure, valve assemblies can be provided for each forward side connection port of each of the auxiliary fuel tanks. The valve assemblies can each comprise a plate positioned adjacent an internal opening of the corresponding forward side connection port, with at least a portion of the plate being aligned with at least a portion of the internal opening. A biasing member biases the plate away from the internal opening, but the biasing member is compressible under the force of fuel against the plate in a severe deceleration event, to collapse the plate toward the internal opening to help prevent damage from a, so-called, "water hammer" effect.

DETAILED DESCRIPTION

In the following description, certain specific details are set forth in order to provide a thorough understanding of various embodiments of the present disclosure. However, upon reviewing this disclosure one skilled in the art will understand that the invention may be practiced without many of these details. In other instances, well-known structures and methods associated with aircraft fuel systems and related operations have not been described in detail to avoid unnecessarily obscuring the descriptions of the embodiments of the invention.

In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, and these terms and variants thereof are intended to be construed as non-limiting.

The present disclosure is described in the context of aircraft fuel tanks. However, as will be appreciated by those skilled in the art after reviewing this disclosure, various embodiments may have application in other fuel systems. Also, various portions of the present disclose may be described in the context of application to particular aircraft, such as, for example, the Boeing™ 737 ™. However, as will be appreciated by those skilled in the art after reviewing this disclosure, various aircraft models or types (e.g., Boeing 757™, 767™, 777™, and all AIRBUS™ aircraft), are contemplated herein, and are not outside of the scope of the applicability of the present disclosure and/or various equivalent modifications which could be made within the spirit and scope of this disclosure to accommodate those other aircraft.

Figure 1:
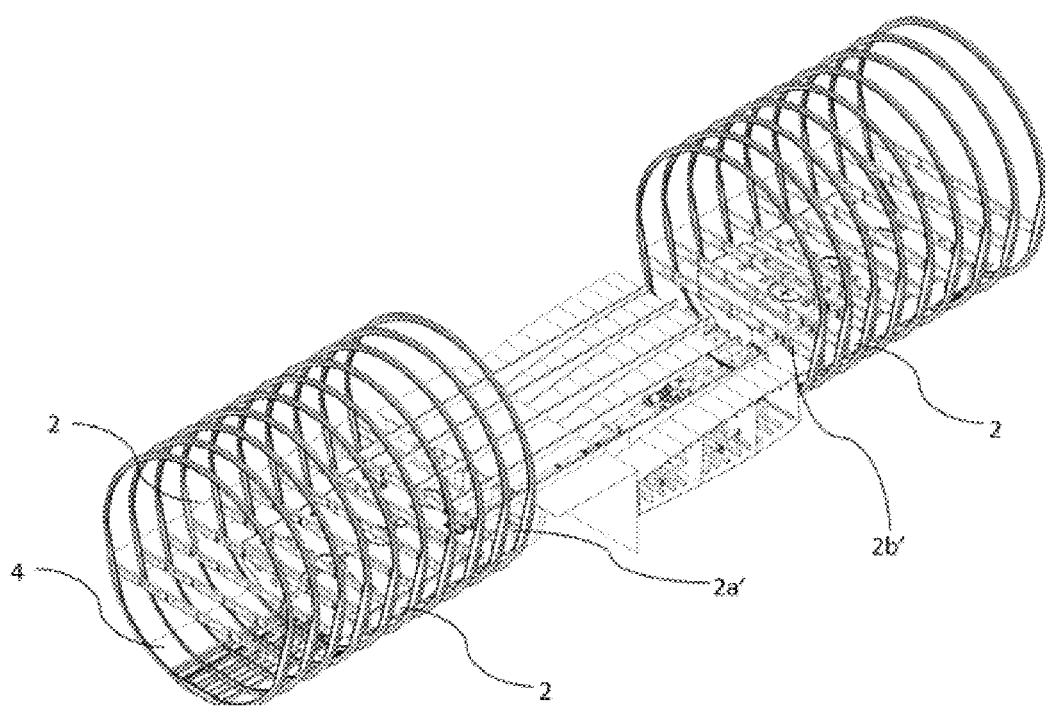
FIG. 1 is a simplified perspective view of an auxiliary fuel tank system installed within an aircraft fuselage, not showing the center fuel tank, for some embodiments of the present disclosure.
Figure 2:
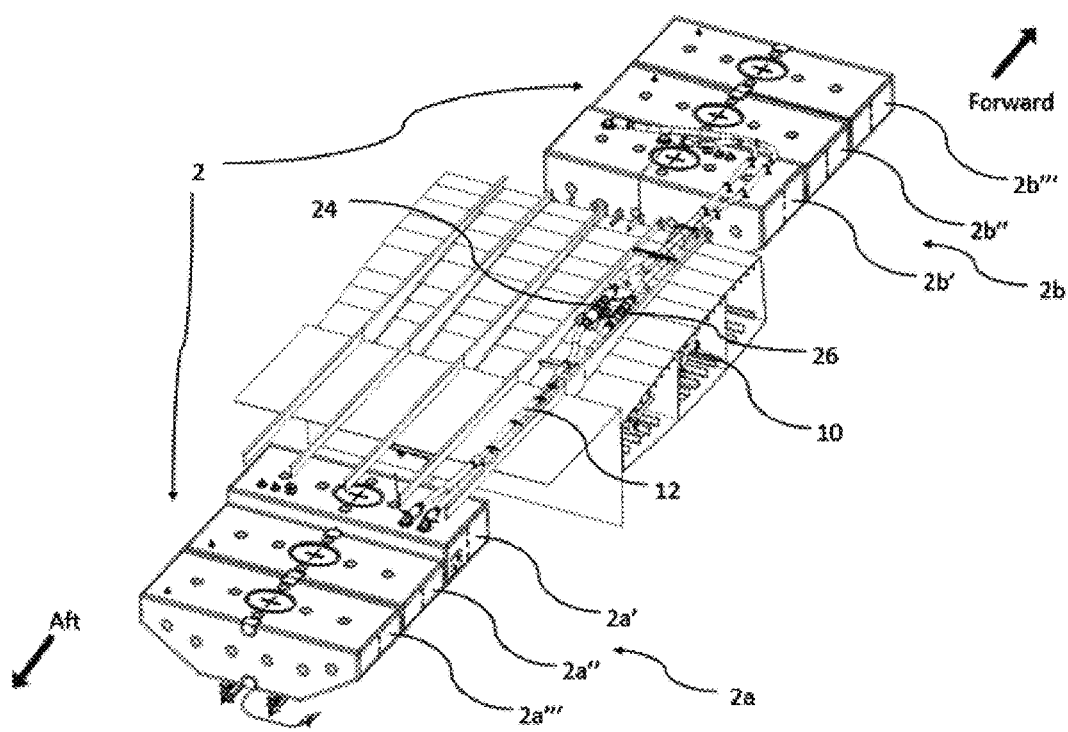
FIG. 2 is a partial cutaway perspective view showing a group of aft auxiliary fuel tanks, a group of forward auxiliary fuel tanks, and a center tank of an aircraft, for some embodiments of the present disclosure.

Referring to FIGS. 1 & 2, auxiliary fuel tanks 2 of the present disclosure can be can be installed in a cargo cabin 4 of an aircraft, or other portion of the aircraft fuselage 6. The auxiliary fuel tanks 2 can be modular in construction, in that they can comprise multiple separate, but fluidly connectable, fuel tanks, which can be conveniently installed or removed, according to required capacity for a particular mission or flight, and can be quickly and conveniently connected or disconnected in relation to a fuel delivery system (which may include a modified fuel delivery system for a center fuel tank 10 of the aircraft).

Referring to FIG. 2, in some embodiments of the present disclosure, a group of aft auxiliary fuel tanks 2a and a group of forward auxiliary fuel tanks 2b are provided. Each group 2a, 2b can include a plurality of auxiliary fuel tanks 2 (e.g., three (3) fuel tanks, or more than three, or less than three), with at least one master fuel tank 2a', 2b' in each group.

Figure 3:
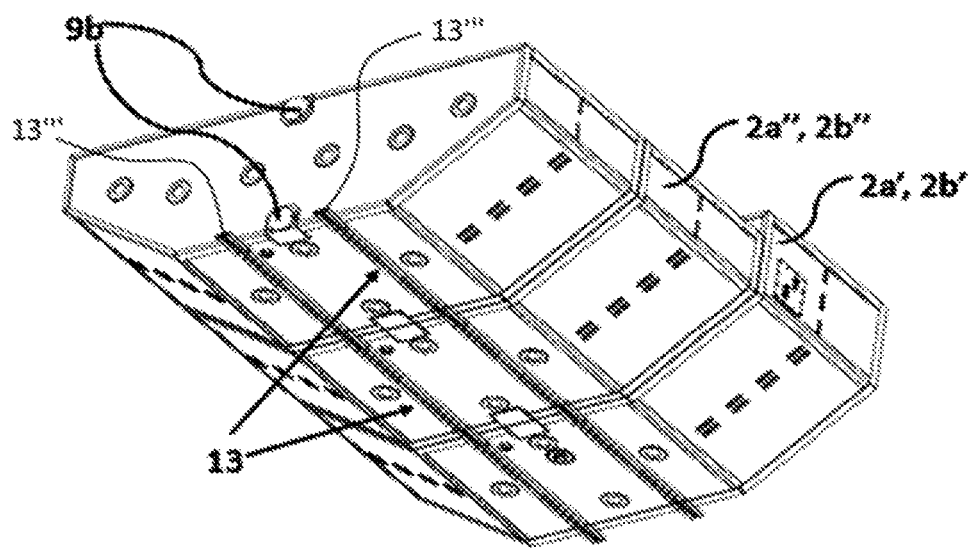
FIG. 3 is a bottom perspective view of the group of auxiliary fuel tanks, with a master tank, for some embodiments of the present disclosure.
Figure 4A:
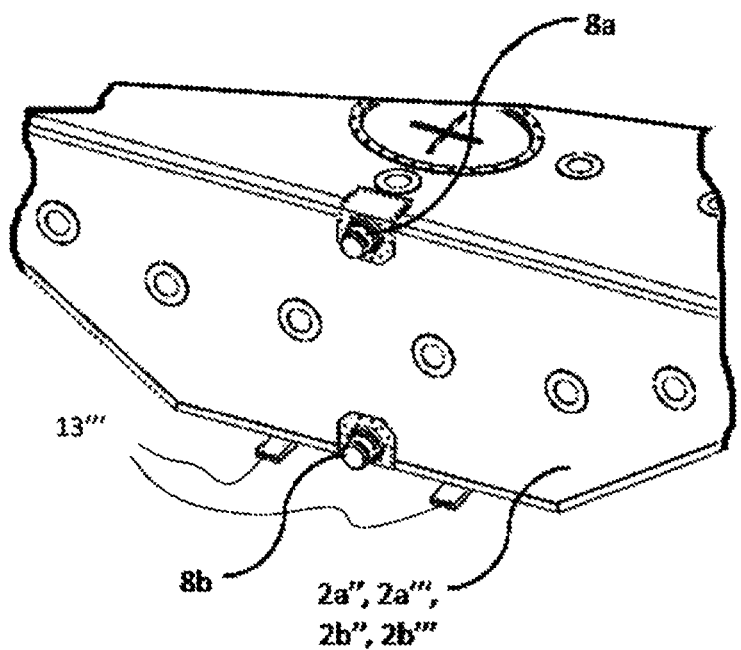
FIG. 4*a* is an enlarged partial perspective view of an auxiliary fuel tank showing inter tank connection ports, for some embodiments of the present disclosure.

Referring to FIG. 3, which can represent both the aft group 2a or the forward group 2b of auxiliary fuel tanks 2 (in some embodiments, where the aft and forward fuel tanks are interchangeable), slave auxiliary fuel tanks 2a", 2b", 2a''', 2b''', can each be in fluid communication with the master fuel tank 2a', 2b', via quick connect fittings 5 (as further described below). In particular, for example, the middle tank 2a", 2b" and third tank 2a''', 2b''' in FIG. 3, can be slave tanks to the master tank 2a', 2b'. Referring to FIG. 4a, the middle fuel tank 2a", 2b" or third tank 2a''', 2b''', can each comprise inter-tank fluid connection ports, including, for example, a vent connection port 8a near a top portion of the tank, and a liquid transfer connection port 8b near the bottom portion of the tank. Each of the slave tanks can have connection ports 8a, 8b (e.g., female connection ports) on both the forward and aft side of the tank, with removable caps 9a, 9b provided on the connection ports 8a, 8b, of the last slave tank in each group facing away from the remainder of the fuel tanks. In this manner, when aligned, the slave tanks can be fluidly connected to one another in series, and in turn, to the master tank (which itself can be provided with corresponding and/or aligning connection ports facing the nearest slave tank), via quick disconnect fittings 5 that couple with the connection ports 8a, 8b.

The master tank 2a', 2b' can be, in turn, connected to a fuel delivery system for the aircraft, as will be appreciated by those skilled in the art after reviewing this disclosure. The fuel delivery system can be connected to, or integral to, a center fuel tank 10 (See, e.g., FIG. 2). In some embodiments, each slave tank in each group, can be optionally installed or removed, depending on desired fuel capacity, leaving only the master tank of the group, if the master tank provides sufficient auxiliary fuel capacity as desired. The master tanks can also be optional, but in some embodiments, a master tank is required for the forward or aft sides of the auxiliary fuel before installing slave tanks, since operation of the slave tanks can be integral with instrumentation provided in a corresponding master tank.

When the individual tanks in each group 2a, 2b, of the auxiliary fuel tanks 2 are connected in series, as described above, they can be in level equilibrium in some embodiments, and fuel from each of the slave auxiliary fuel tanks, 2a", 2b", 2a''', 2b''' transferred to the engines for combustion can pass through the respective master fuel tank 2a', 2b', before reaching a fuel transfer system that delivers the fuel to the engines for combustion.

In some embodiments of the present disclosure, the group of forward auxiliary fuel tanks 2b is configured in similar or substantially the same manner as the group of aft auxiliary fuel tanks 2a. However, the aft group 2a can have its master tank 2a' disposed nearest the center fuel tank 10 on the aft side of the center fuel tank, with the series of slave tanks extending toward the rear of the aircraft from there, and the forward group 2b can have its master tank 2b' disposed nearest the center fuel tank 10 on the forward side of the center fuel tank, with a series of slave tanks extending toward the front of the aircraft from there, as best seen in FIG. 2.

Figure 4B:
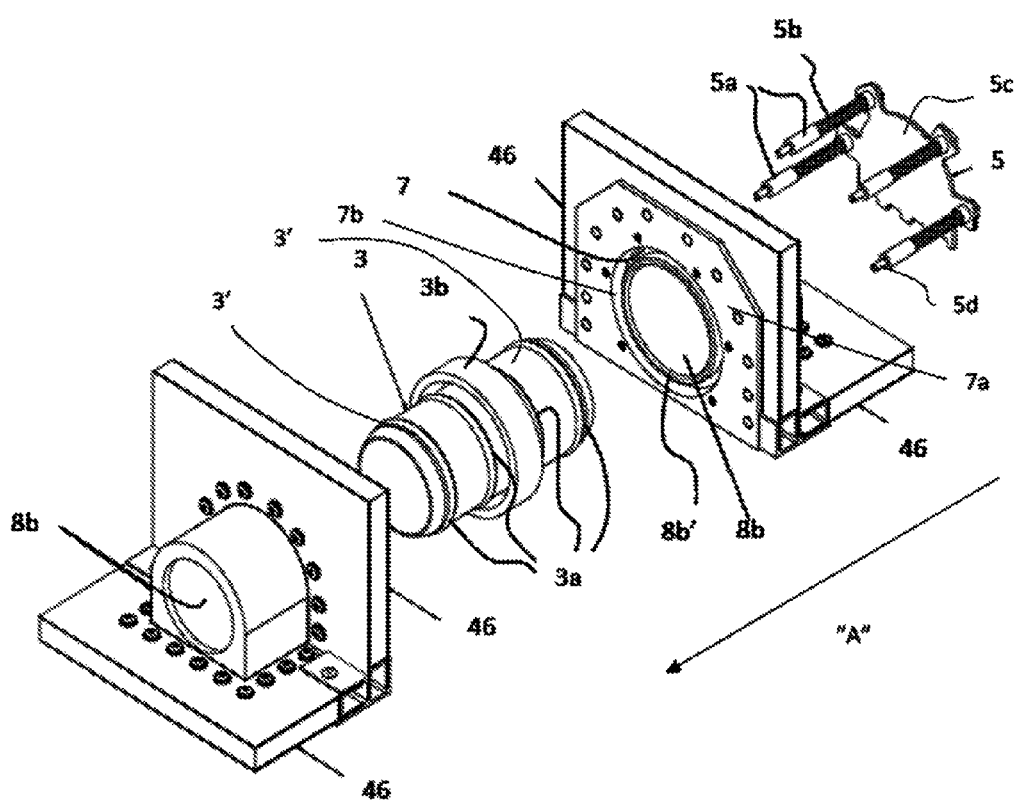
FIG. 4*b* is a partially exploded perspective view of a fitting and valve assembly, provided for connection ports of the auxiliary fuel tanks, the value assembly being provided for forward side connection ports.

Referring to FIG. 4b, in some embodiments of the present disclosure, the connection ports 8b, (and/or the connection ports 8a), can be cylindrical conduits having an annular sidewall 8b' that extends through the vertical wall panels 46 of the auxiliary fuel tank 2, longitudinally inward past the vertical wall panels 46 (e.g., 2-8 cm, or more, or less, in various embodiments). In some embodiments, the sidewall 8b' of the conduit is flush with an exterior surface of the vertical wall panel 46, or can extend slightly longitudinally outward past the wall panel (e.g., 1-4 cm, or more, or less, in various embodiments). In some embodiments, an exterior plate 7a is provided on an exterior surface of the vertical wall panels 46, through which a circular aperture 7b is provided for alignment with an exterior opening of the connection port 8b. A annular groove 7 comprised of an annular space defined by radially inward facing sidewall of the circular aperture 7b of the exterior plate 7a, and a radially outward facing surface of the sidewall 8b', is provided. A cylindrical stub fitting 3, having opposite male insertion portions 3', can be provided. A pair of longitudinally spaced apart elastomeric, of flexible, O-ring, or annular seal members 3a, can be attached to an outer surface of each of the male insertion portions 3'. In addition, an elastomeric, or flexible, annular collar member 3b can be provided having a larger diameter than the fitting 3, through which the fitting 3 can extend. The male portions 3' of the fitting 3 can be inserted into the connection ports 8b (and/or 8a in some embodiments), to snugly mate the seal members 3a, against an inner surface of the sidewall 8b' of the connection ports 8b. The inner surface of the sidewall 8b' can be a smooth cylindrical surface. Adjacent auxiliary fuel tanks 2 can be slidably moved toward one another until opposite longitudinal sides of the collar 3b fit snugly within opposed grooves 7 of opposite facing auxiliary fuel tank 2 walls 46. The collar 3b is configured such that, when it is snugly fit, and abuts on opposite sides against surfaces in opposed grooves 7 on opposite facing auxiliary fuel tanks 2, the annular seal members 3a are snugly positioned within opposite connection ports 8b on opposed auxiliary fuel tanks 2, so that the fitting 3 is in a connected position, fluidly connect the opposed auxiliary fuel tanks 2 in sealed manner. In addition, stop blocks 13''' (discussed further below), can be provided to retain the auxiliary fuel tanks 2 in position once the seal members 3a and collar 3b are in this connected position, so that the fittings 3 remain connected to the connection ports 8b until the stop blocks are removed. The assembly described comprising the fittings 3, collar 3b, connection ports 8b, and stop blocks 13''' provide a convenient manner for connecting auxiliary fuel tanks 2 together without the necessity for tools used to disconnect fittings.

In some embodiments, valve assemblies 5 are provided to help prevent/regulate fuel flow in the auxiliary fuel tanks 2 under a severe decelerating event that could otherwise lead to potential damage (e.g., damage from water hammer effect). Referring to FIG. 4b, the valve assemblies 5 can each include a spring loaded plate 5c, spring biased in an open position, with the plate 5c disposed to cover the internal opening of a connection port 8b. The plate 5c can be attached at peripheral portions thereof to inward end portions of elongated retaining members 5d, which in turn are attached at outward end portions to the vertical wall panel 46 of the corresponding fuel tank (or a wall attached to an interior of the vertical wall panel 46). In some embodiments, four (4) elongated retaining members 5d are provided, while in other embodiments, more than four, or less than four, elongated retaining members 5d are used to attach the plate 5c to the vertical wall panel 46. In some embodiments, coiled biasing springs 5b are provided over each of the elongated retaining members 5d, the retaining members 5d passing concentrically through the coiled biasing springs 5b, and with the biasing springs 5b longitudinally located between the plate 5c and a stop member 5a on the opposite end portion of each retaining member 5d. Under normal operating conditions, the plates 5c can be held in the open position by spring force of the biasing springs 5b, and fuel can flow easily around the plates 5c, through the connection ports/fittings 3, and into adjacent tanks 2. However, under unusual deceleration forces, a mass of fuel moving against the plates 5c, in a forward direction (shown by arrow "A" in FIG. 4b) can compress the biasing springs 5b, while forcing the toward the inside opening of the corresponding connection port 8b, to throttle the valve assembly 5, to a fully closed or modulated position, against an inside opening of the connection port 8b. This can prevent a sudden rush of fuel and the associated mass into the adjacent tank.

As will be appreciated by those skilled in the art after reviewing this disclosure, the valve assembly 5 can be provided on at least a forward connection port 8b of each auxiliary fuel tank 2, including slave tanks and master tanks, to mitigate forward fuel movement in severe aircraft deceleration events.

Figure 5:
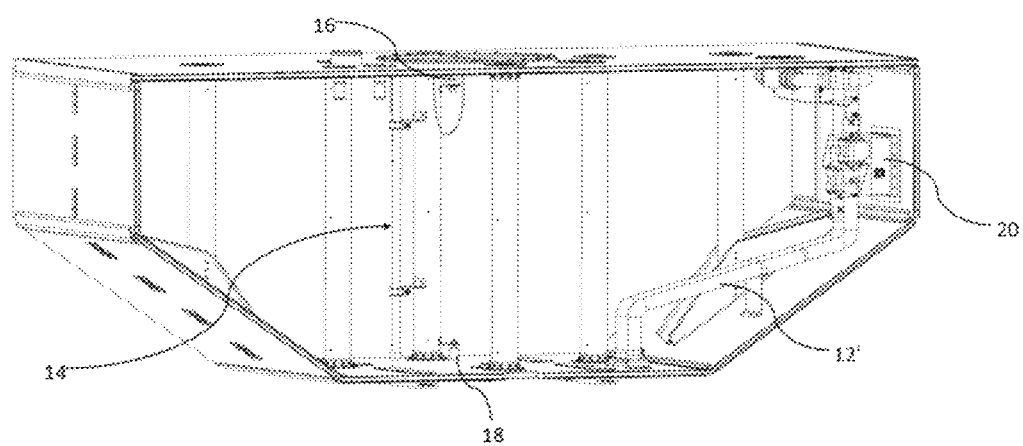
FIG. 5 is a perspective view of a master auxiliary fuel tank, with forward and aft facing wall panels and horizontal reinforcement members removed, to expose internal configuration, for some embodiments of the present disclosure.

Referring to FIG. 5, for some embodiments of the present disclosure, the master fuel tanks 2a', 2b', can each include instrumentation and conduits not included in the corresponding slave tanks, for use in monitoring, controlling, and for transferring fuel to and from its corresponding group 2a, 2b of auxiliary fuel tanks 2. For example, since all auxiliary fuel tanks in a group 2a, 2b can be in level and pressure equilibrium, in some embodiments, only the master fuel tanks 2a', 2b' contain a capacitance probe 14 (or other fuel quantity probe) used to monitor level in the group 2a, 2b of auxiliary fuel tanks. In addition, a high level float level sensors 16 and low level float sensor 18, can be provided in each of the master fuel tanks for sensing tank overflow during filling, and for sensing tank empty, for all tanks in a group. Also, in some embodiments, only the master fuel tanks 2a', 2b' are connected directly to a fuel delivery system and/or re-fueling system of the center tank 10 (or other non-auxiliary fuel tank) for use in fuel transfer to engines, and for refueling, via interior re-fueling/transfer lines 12' and valves 20. Thus, in some embodiments, the master tanks 2a', 2b' contain all monitoring instruments for the respective group of auxiliary fuel tanks 2, or contain more monitoring instruments than the slave tanks.

Figure 6:
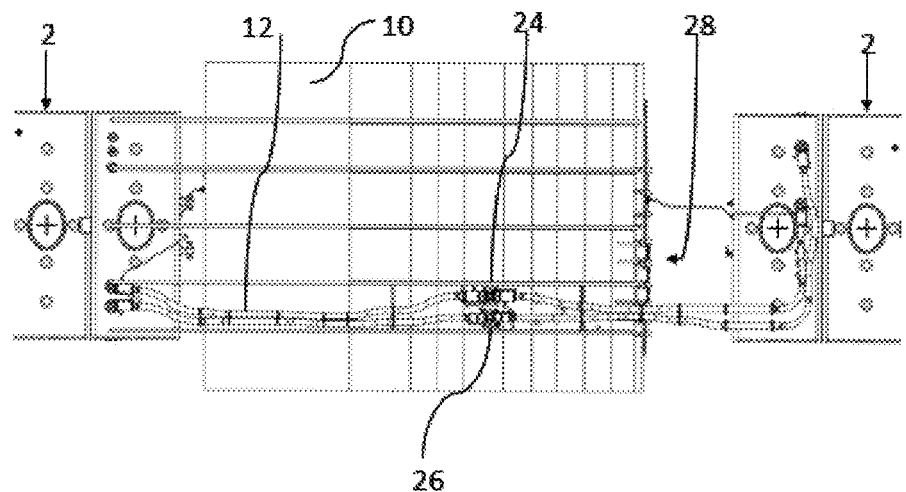
FIG. 6 shows a top plan view of master tank fuel tanks fluidly connected to a center fuel tank, for some embodiments of the present disclosure.
Figure 7:
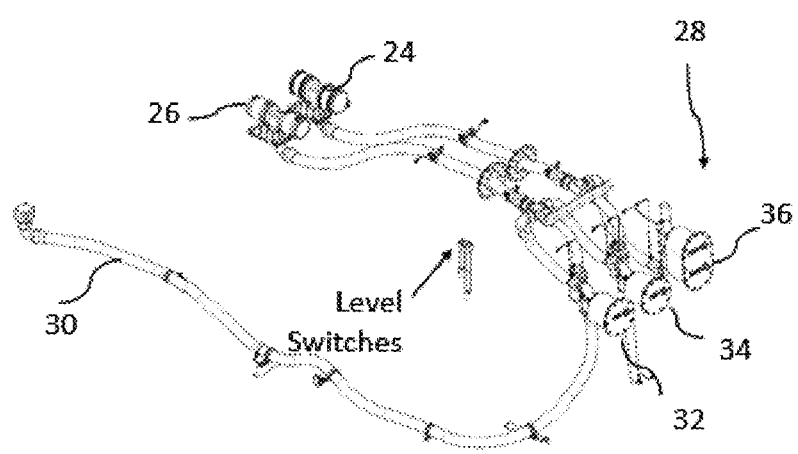
FIG. 7 shows a simplified view of a fuel transfer system configuration for some embodiments of the present disclosure.

FIGS. 6 & 7 show an example center tank fuel transfer system for some embodiments of the present disclosure. Each of the forward and aft master tanks 2a', 2b' can be in fluid connection to the center tank 10, through refueling/transfer lines and vent lines 12. The connections can be through a top panel of the center tank 10, connected to manifolds 24, 26. These lines can, in turn, be in fluid communication with valve assemblies 28 mounted on the aft face of the center tank, and then in turn, to a center tank refuel system and center tank vent system. Valves of the value assemblies 28 can be controlled via an auxiliary tank control panel, which may be located remotely, to control whether fuel is flowing to the auxiliary tanks during refueling, or from the auxiliary tanks during fuel transfer, as will be appreciated by those skilled in the art after reviewing this disclosure.

Referring to FIG. 7, showing plumbing/valves integral with the center fuel tank 10, in some embodiments, the "Aux tank re-fuel line" 30 can be a refuel line used to fill master tanks 2a', 2b', when "Aux tank refueling valve" 32 is open.

When open, this can allow refueling fuel to pass through the "Fuel in/out" manifold 26 to the master tanks 2a', 2b', and then to any slave tanks 2a", 2b", 2a''', 2b'''. When the center valve 34 is opened, this can allow incoming fuel, through the same re-fuel line, to fill the center fuel tank. Also, the vent valve 36 can be opened to allow tanks (including master tank and slave tanks) to vent through the "Vent manifold" 24 connected to a vent system of the center fuel tank. The vent valves 36 can be closed during fuel transfer to allow fuel to pressure through to the transfer conduits, such as by compressed air. During refueling, or during operation below say, 12,000 feet, in some embodiments, the vent valves are open.

As shown and described in the illustrated examples, in some embodiments, there are three auxiliary tanks in each group, one master fuel tank and two slave tanks; however, as will be appreciated by those skilled in the art, any number of auxiliary fuel tanks can be provided in each group, as limited by the size of the aircraft and/or weight and power limitations.

Figure 8:
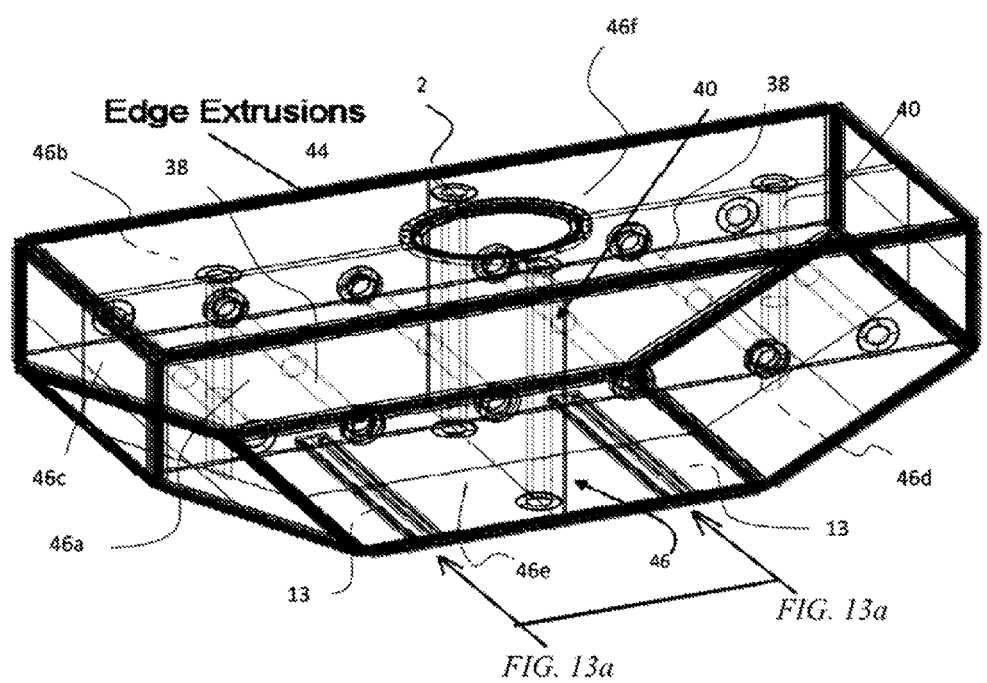
FIG. 8 is a transparent perspective view of a tank structure for an example auxiliary fuel tank, for some embodiments of the present disclosure.
Figure 9:
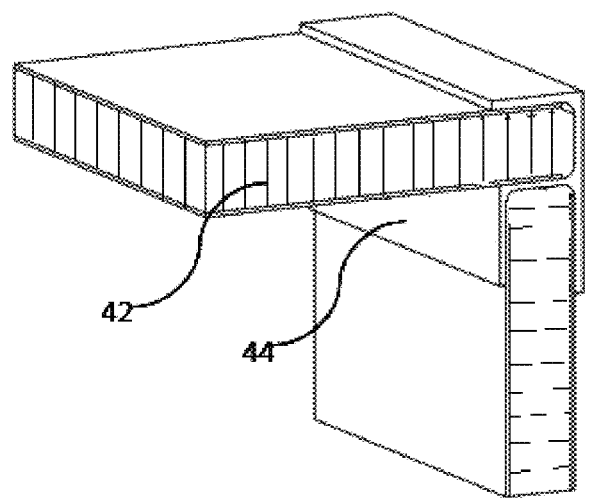
FIG. 9 is a perspective view of a cut-out section of an auxiliary fuel tank showing an edge joint between wall panel sections, and an internal wall structure, for some embodiments of the present disclosure.

Referring to FIGS. 8 & 9, in some embodiments of the present disclosure, each of the auxiliary fuel tanks 2 can comprise double-wall wall panels 46, with a core material made of "honeycomb" structure, as will be appreciated by those skilled in the art after reviewing this disclosure. In some embodiments, the core material, or the entire thickness of each double-wall wall panel, can be ¾" thick. In other embodiments, the thickness is greater or less than ¾" inches. The core material ("honeycomb" structure), can include, without limitation, the following specifications in some embodiments: MIL-C-7438 Grade B, Cell six ⅛", Foil thickness 0.02, perforated, density 8.1 pcf, Al 5052. The skin material specifications can include, without limitation, 0.040 THK, 2024-T3, QQ-A-250/4 or 5 Aluminum.

The wall panels 46 can be bound together via edge extrusions 44, defining the edges of the auxiliary fuel tanks 2. Each of the auxiliary fuel tanks 2 can comprise a single forward facing wall panel 46a and a single aft facing wall panel 46b; a partial height vertical side wall panel 46c on each lateral side of the tank 2; an angled side wall panel 46d on each lateral side portion of the tank extending from a bottom edge portion of each corresponding vertical side wall panel (angled downwardly inward from the respective vertical side wall panel 46c); a horizontal bottom wall panel 46e having lateral side edges to which respective bottom end portions of the angled side wall panels 46d are coupled; and a single horizontal top wall panel 46f (connected at its lateral edges to the top edges portions of the vertical side wall panels 46c, at it forward edge to the forward facing wall panel 46a, and at its aft edge to the aft facing wall panel 46b).

Referring to FIG. 8, in some embodiments, a plurality of reinforcement members (e.g., tubes, or other elongated members) 38, 40 can be provided within the auxiliary fuel tanks 2. For example, a plurality of horizontal reinforcement tubes 38 can be attached at end portions thereof to inside walls of the forward facing wall panel 46a and the aft facing wall panel 46b, extending horizontally therebetween. Also, a plurality of vertical reinforcement tubes 40 can be provided within the auxiliary fuel tanks 2 and can be attached at end portions thereof to inside walls of the horizontal top wall panel 46f and horizontal bottom panel 46e, extending vertically therebetween.

Figure 10:
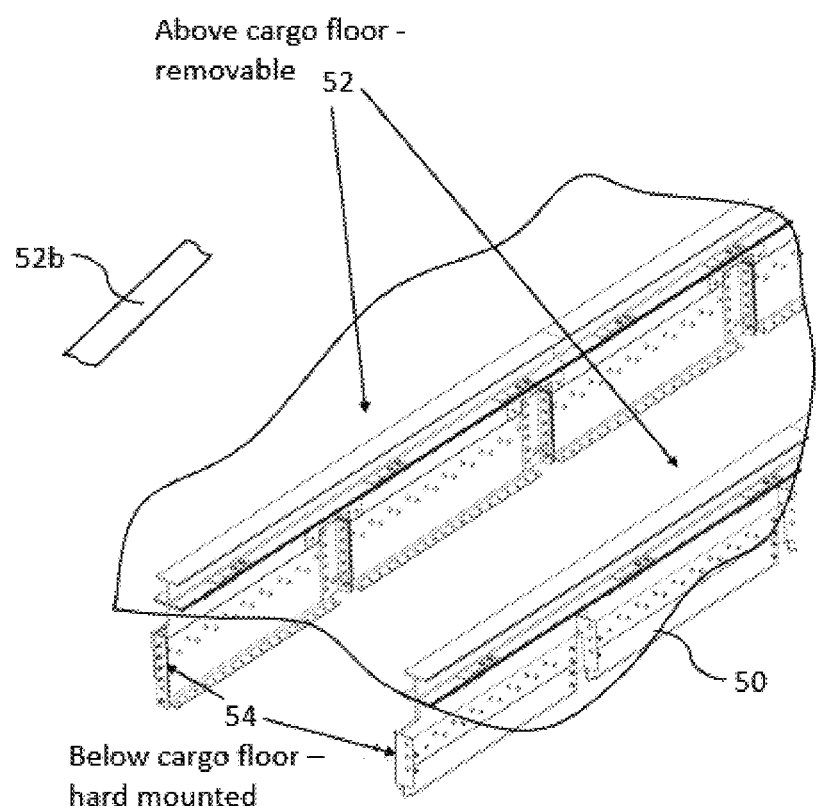
FIG. 10 is a partial perspective view of a rail and rail support assembly for various embodiments of the present disclosure.
Figure 11:
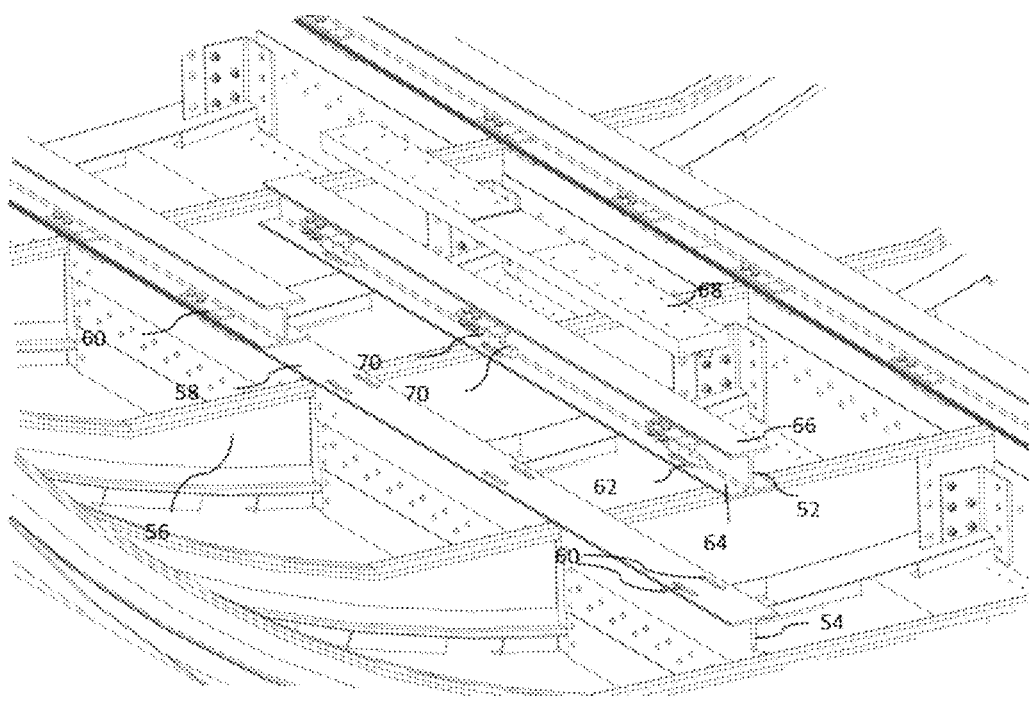
FIG. 11 is a partial perspective exploded view showing various components for the rail and rail support assembly of FIG. 10, installed within an aircraft with the rail support mounted on formers, for some embodiments of the present disclosure.

In some embodiments of the present disclosure, parallel longitudinal rails can be installed on or near a floor 50 of the aircraft, such as, for example, within the cargo cabin, upon which the auxiliary fuel tanks 2 can be mounted. Referring to FIGS. 10 & 11, the rails 52 can extend above the floor, or be fully positioned above the floor 50. Below the rails, corresponding rail supports 54 can be provided and fixedly mounted to structural members of the aircraft fuselage (e.g., formers 56). In some embodiments, the rail supports 54 can be installed below the floor 50, or partially below the floor, or a top portion of the rail supports 54 can be aligned with the floor 50, to expose mounting members (e.g., slots) at or near the level of the floor. The rail supports 54 can be permanently mounted in place. In some embodiments, the rails 52 can be removably coupled to the rail supports 54 above the floor 50 by one or more of various mechanical structures (e.g., via slots as described below). In some embodiments, the rails 52 can be provided in elongated sections, of equal, or different lengths, depending on the need. As such, an operator can remove or install the rails 52 in sections depending on how many auxiliary fuel tanks 2 are required for a current trip, to support the auxiliary fuel tanks 2.

Each of the rail supports 54 can have a plurality of longitudinal slots 60 disposed on a top flange portions 58 thereof. As shown in FIG. 11, the slots 60 can be provided in parallel pairs, and pairs of the slots 60 can be formed at longitudinally spaced apart locations on the top flange portion 58 of the rail supports 54.

Each of the rails 52 can have a generally I-shaped cross section (in some embodiments, the rails also include a rail track 68 formed on, or connected to, a top flange 66 of the rails 52), and the rails 52 can have a bottom flange 64 that is wider than top flange 66. The bottom flange 64, extending laterally away from the center wall of the rail 52, from both sides of the center wall, can have a plurality of slots 62 formed thereon. The slots 62 can be formed on the bottom flange 64 of the rails 52 in a manner corresponding in alignment to the longitudinal slots 60 disposed on the top flange portions 58 or the rail support 54. That is, the slots 62 on the rail 52 can be provided in parallel pairs, oriented in parallel on the rail 52 on opposite sides of the center wall of the rail, in corresponding alignment with the pairs of longitudinal slots 60 on the rail support 54, and a plurality of pairs of slots 62 are provided on the rail can, formed at longitudinally spaced apart locations on the rail 52 in corresponding alignment with the longitudinally spaced apart slots 60 on the rail supports 54. As such, the rail 52 can be mated to the rail support 54, with aligned slots 60, 62, such that connection members 70 can be inserted through each of the respective aligned slots 60, 62, to couple the rail 52, to the rail support 54.

Figure 11A:
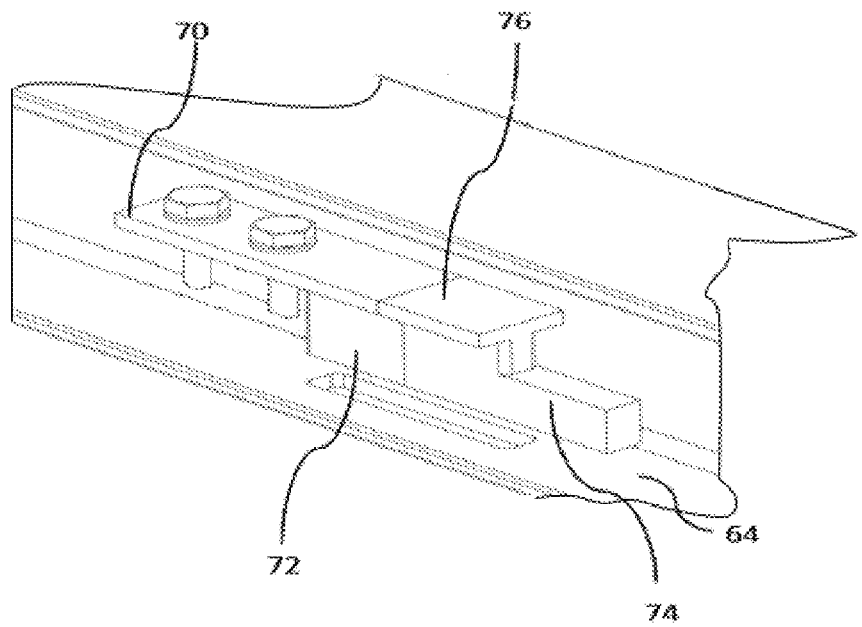
FIG. 11a is shows an enlarged perspective view of the connection member shown in FIG. 11.
Figure 12:
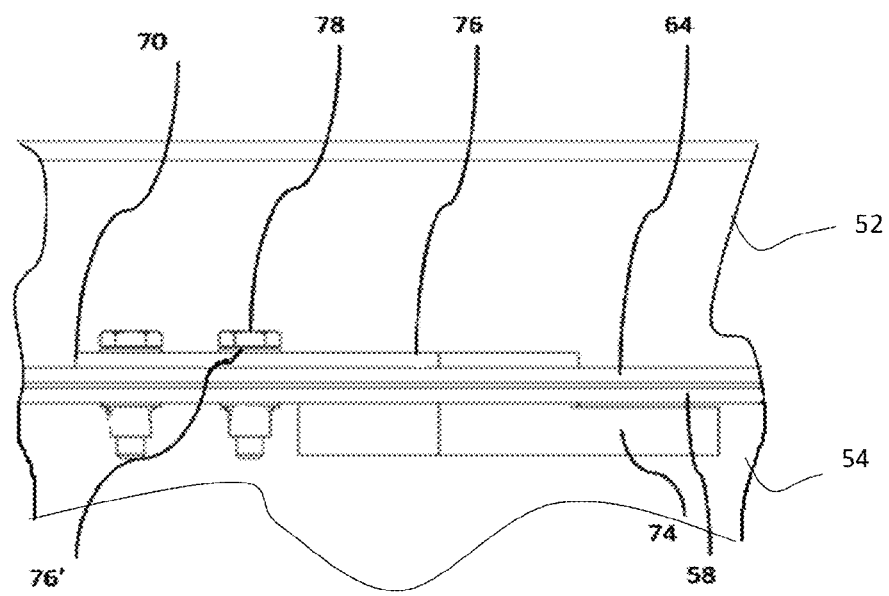
FIG. 12 is a partial side elevation view of the rail and rail support assembly of FIG. 11, with the rail connected to the rail support by a connection member, for some embodiments of the present disclosure.

Referring to FIGS. 11a & 12, the connection members 70 can comprise a flange 76, insertion portion 72, and longitudinally extending catch member 74 formed integral with the insertion portion 72. The flange 76 can extend longitudinally past a first end portion of the insertion portion 72, and the catch member 74 can extending longitudinally past a second end portion of the insertion member 72. The catch member 74 and insertion portion 72 can be inserted into and through aligned slots 60, 62 of the rails until the catch member 74 passes through, and a bottom wall of the flange 76 (disposed at right angel to vertical sidewalls of the insertion portion and catch member), abuts flush against a top surface of the bottom flange 64 of the rail 52. Thereafter, the insertion portion 72 is situated within the slots 60, 62, with the catch member 74 extending longitudinally past the slots 60, 62, beneath a top flange 58 of the rail support 54, and with a longitudinal end portion of the flange 76 also extending past the slots 60, 62, in an opposite direction from the catch member 74, above the bottom flange 64 of the rail 52. Lugs 78 can be inserted through corresponding apertures on the extended portion 76' (extending past the slots 60, 62) of the flange 76, which can pass through corresponding apertures on the top flange 58 of the rail supports, and bottom flange 64 of the rail 52, to secure the rail 52 to the rail support 54. In this manner, the rail and rail supports are "hooked" together by the connection members, as the connection members cannot pass through the slots 60, 62, without being pivoted in a vertical plane. This can provide a quick connect/disconnect system for removing/installing rails.

Figure 13A:
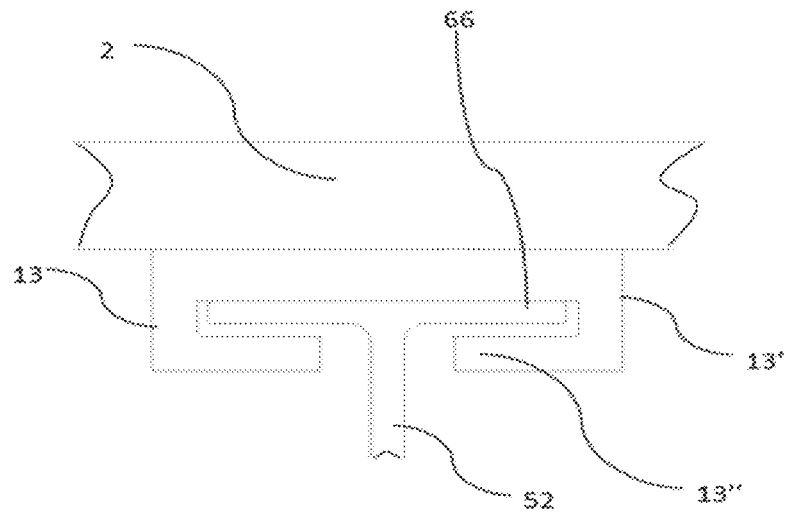
FIG. 13a is a partial front elevation view of a receiving track on an auxiliary fuel tank, as viewed from line 13a-13a in FIG. 8, with the receiving track slidably connected to a rail, for some embodiments of the present disclosure.
Figure 13B:
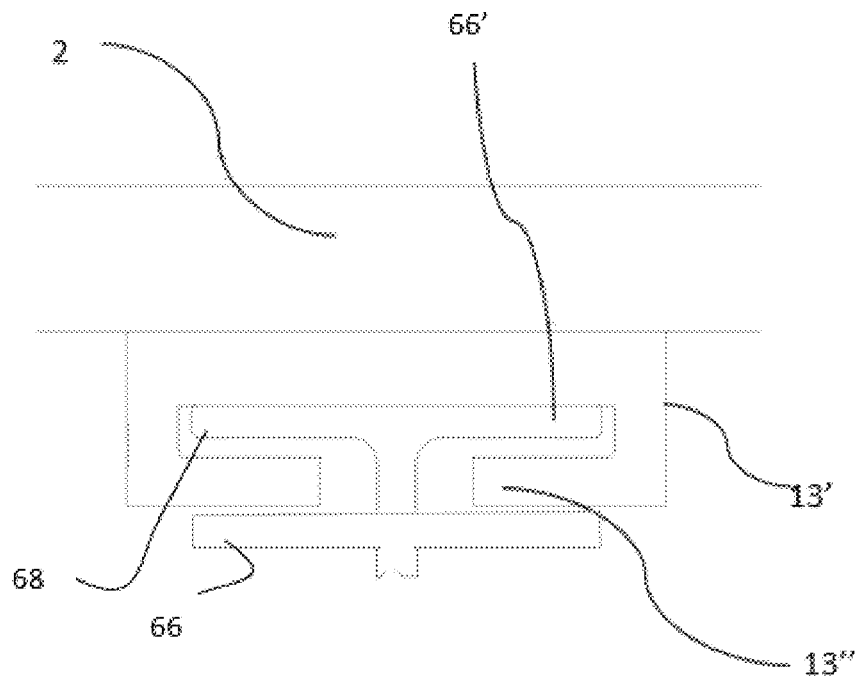
FIG. 13b is a partial front elevation view of a receiving track on an auxiliary fuel tank, as viewed from line 13a-13a in FIG. 8, with the receiving track slidably connected to a rail track of a rail, for some embodiments of the present disclosure.

In some embodiments, the auxiliary fuel tanks 2 are each provided with two laterally spaced apart and parallel elongated mounting rails 13 (See, e.g., FIG. 3), fixedly attached to a bottom of the tanks 2, and extending from an aft portion of the tanks 2 to a forward portion of the tanks 2. In some embodiments, the mounting rails 13 can be a receiving track 13, such as shown in the partial front elevation view of FIG. 13a. The receiving track 13 can approximate a C-channel, having a pair of outer walls 13' that extend downward, then inward on an inwardly extending wall portion 13", without meeting, to be able to slidably received the top of the rails 52, including the top flange 66 of the rails, with a top part of a web of the rails 52 passing between the walls 13', and with the top flange 66 of the rails resting horizontally on an upward facing surface of the walls 13' (upward facing surface of the inwardly extending wall portion 13"), to grip the top of the rails 52. Alternatively, as discussed above, the rails 52 can include a rail track 68 formed on, or connected to, a top flange 66 of the rails 52. The rail track 68 can also include a vertical center wall and laterally extending flange 66', extending longitudinally in parallel with the top flange 66 to which it is attached. In such alternative embodiments, the flange 66' of the rail track 68 can be slidably received within the receiving track 13, such that inwardly extending wall portions 13" of the receiving track 13, are sandwiched between the top flange 66 and the flange 66' of the rail track 68, and this configuration can provide additional support for mounting the tank 2.

When an auxiliary fuel tank 2 is connected to the rails 52, it can be secured in place by any of various potential means for blocking movement of the tank from sliding away from the rails 52, such as stop blocks 13''', as described further below, as will be appreciated by those skilled in the art after reviewing this disclosure.

In other embodiments, the rails 52 can be permanently affixed in parallel to the bottom of each auxiliary fuel tank 2, with each tank having a pair of rails affixed thereto, aligned longitudinally and spaced apart laterally so as to align with the rail supports 54. The rails could be connected to the rail supports 54 in same or similar fashion as described above, or by other connection means, as will be appreciated by those skilled in the art after reviewing this disclosure.

In the embodiments described above, the various auxiliary fuel tanks 2 can be slidably removed and/or mounted selectively to the rails 52, and the rails 52 can be selectively removed or attached to the rail supports 54, depending on the number of tanks desired for a particular mission.

In some embodiments, when the rails 52 are removed, flexible strip-shaped covers 52b (See, e.g., FIG. 10), which can have a foot print similar to the bottom of a rail 52, or the top surface of a rail support 54, can be installed over the elongated top flanges 58 of the rail supports, to cover the rail supports 54 and impart uniformity to a surface of the cargo bin floor, when rail 52 sections are not in use to support auxiliary fuel tanks 2.

Referring to FIG. 4a, in some embodiments, the stop mechanism for use in retaining the auxiliary fuel tanks 2, can be stop blocks 13'''. The stop blocks 13''' can be slidably connected to the rail 52, or top flange 66 of the rail, in similar manner to the receiving tracks 13 of the auxiliary fuel tanks 2. In some embodiments, a longitudinal cross section of the stop blocks can be the same or similar to the longitudinal cross section shown for the receiving track 13 in FIG. 13a. As such, stop block 13''', can be slidably attached to the rail 52, between auxiliary fuel tanks 2, and can abut on opposites sides against ends of receiving tracks 13 of the auxiliary fuel tanks 2. When the stop blocks 13''' are positioned on the rail 52, tight against the receiving tracks 13 or other part of the auxiliary fuel tanks 2, after they have been positioned with the fittings 3 of the respective tanks 2 in connected position, then the stop blocks can be secured in place to the respective rails 52 by bolts (not illustrated) or other connection means, as will be appreciated by those skilled in the art. The bolts or connection means can be easily unscrewed, or otherwise uncoupled, to release the stop blocks 13''', to allow the tanks 2 to slide on the rails 52 during installation or removal.

Easy removal of the auxiliary fuel tanks 2 can be achieved by disconnecting all quick release conduit couplings, comprising unlocking any stop mechanisms (e.g., stop blocks 13''') used to prevent the tanks from sliding along the rails, then sliding the tanks over the rails 52 and lifting the tanks away from the rails 52. Fuel capacity can be easily added or reduced using the features of the present disclosure.

In some embodiments of the present disclosure, auxiliary fuel tanks 2 can be located/stored at, or within convenient distance, of one or more airports. Slave tanks can be pre-certified and approved for installation on various aircraft models. In some embodiments, a service can be provided whereby customer aircraft operators who have already engaged the service to equip their aircraft for using various aspects of the present disclosure, can contact the service via internet or phone to reserve one or more slave tanks at one or more airport locations. On arrival at the designated airport, the service provider can provide personnel to manage and or assist in the installation, or removal, of additional tanks, provide the required documentation, revised AFM (Aircraft Flight Manual) supplement, updated W&B (Weight and Balance) documents, etc and release the aircraft back to service. In some embodiments, the service provider can charge customers a rental fees, or other fees, for use of the tanks, including associated services for installation and removal.

Although specific embodiments and examples of the disclosure have been described supra for illustrative purposes, various equivalent modifications can be made without departing from its spirit and scope, as will be recognized by those skilled in the relevant art after reviewing the present disclosure. The various embodiments described can be combined to provide further embodiments. The described systems, devices and methods can omit some elements or acts, can add other elements or acts, or can combine the elements or execute the acts in a different order than that illustrated, to achieve various advantages of the invention. These and other changes can be made to the invention in light of the above detailed description.

In general, in the following claims, the terms used should not be construed to limit the disclosure to the specific embodiments disclosed in the specification. Accordingly, the invention is not limited by the disclosure, but instead its scope is determined entirely by the following claims.

What is claimed is:

1. An aircraft auxiliary fuel tank system comprising:
at least one slave fuel tank;
at least one master fuel tank;

the at least one slave fuel tank being fluidly connected to the at least one master fuel tank, and the at least one master fuel tank being fluidly connected to at least one center tank;

wherein the at least one slave fuel tank comprises a plurality of connection ports and is connected with the at least one master fuel tank by at least one of the connection ports near a bottom portion of the at least one slave fuel tank;

a fitting provided between the at least one of the connection ports and a connection port on the at least one master fuel tank; and a valve assembly comprising:
 a plate positioned within the at least one slave fuel tank adjacent an internal opening of the at least one of the connection ports with at least a portion of the plate being aligned with at least a portion of the internal opening, the plate having a first plate face facing away from the internal opening, and a second plate face that is opposite the first plate face and facing toward the internal opening; and
 a biasing member extending from the second plate face toward a fixed surface adjacent the internal opening, the biasing member being configured to bias the plate away from the internal opening to maintain a fluid flow space between the plate and the internal opening, and to compress as a function of a differential between a first fluid-exerted pressure on the first plate face and a second fluid-exerted pressure on the second plate face to permit the plate to move toward the at least one of the connection ports for throttling the valve assembly during a deceleration event.

2. The aircraft auxiliary fuel tank system of claim 1 wherein the at least one fuel tank includes instrumentation not included in the at least one slave fuel tank.

3. The auxiliary fuel tank system of claim 2 wherein the instrumentation includes a level sensor.

4. The auxiliary fuel tank system claim 3 wherein the level sensor includes a capacitance probe.

5. The aircraft auxiliary fuel tank system of claim 1 further comprising at least one rail for slidably retaining the at least one slave fuel tank and the at least one master fuel tank.

6. The aircraft auxiliary fuel tank system of claim 5 further comprising an elastomeric collar positioned over the fitting.

7. The aircraft auxiliary fuel tank system of claim 6 further comprising opposite end portions of the elastomeric collar disposed within an annular groove on each of the at least one master fuel tank and the at least one slave fuel tank.

8. The aircraft auxiliary fuel tank system of claim 5 wherein the fitting is retained in a connected position between the at least one slave fuel tank and the at least one master fuel tank using one or more stop blocks connected to the at least one rail to hold the at least one slave fuel tank and the at least one master fuel tank at fixed positions relative to one another.

9. The auxiliary fuel tank system of claim 1 further comprising a vent line in fluid communication with at least one of the least one master fuel tank and the at least one slave fuel tank.

* * * * *